(12) United States Patent
Simonson et al.

(10) Patent No.: US 9,816,225 B2
(45) Date of Patent: *Nov. 14, 2017

(54) FIBER REINFORCEMENT WITH 1-SILACYCLOBUTANE CROSSLINK UNITS

(71) Applicant: The United States of America, as represented by the Secretary of the Navy, Washington, DC (US)

(72) Inventors: Duane L. Simonson, Brandywine, MD (US); R. Andrew McGill, Lorton, VA (US); Bernadette A. Higgins, Alexandria, VA (US); Michael Papantonakis, Washington, DC (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 35 days.

This patent is subject to a terminal disclaimer.

(21) Appl. No.: 14/923,504

(22) Filed: Oct. 27, 2015

(65) Prior Publication Data

US 2016/0047085 A1    Feb. 18, 2016

Related U.S. Application Data

(62) Division of application No. 12/499,116, filed on Jul. 8, 2009, now Pat. No. 9,169,400.

(Continued)

(51) Int. Cl.
*D06M 13/513* (2006.01)
*B82Y 30/00* (2011.01)
(Continued)

(52) U.S. Cl.
CPC .......... *D06M 13/513* (2013.01); *B82Y 30/00* (2013.01); *B82Y 40/00* (2013.01); *C01B 32/174* (2017.08);
(Continued)

(58) Field of Classification Search
CPC .................................................. D06M 13/513
See application file for complete search history.

(56) References Cited

U.S. PATENT DOCUMENTS 5,001,187 A * 3/1991 Liles ..................... C08G 77/04
                                                            524/745

OTHER PUBLICATIONS

Matsumoto et al Tetrahedron 60 (2004) 7197, 7204.*
OXford Dictionary of Chemisty for Filler 2008.*

* cited by examiner

*Primary Examiner* — Mark Kaucher
(74) *Attorney, Agent, or Firm* — US Naval Research Laboratory; Joseph T. Grunkemeyer (57) ABSTRACT

Disclosed herein is a composition having a plurality of particles of a filler material and crosslinking units having the formula —(SiR—CH$_2$—CH$_2$—CH$_2$)—. The silicon atom in the crosslinking unit is directly or indirectly bound to the filler material. Each R is alkyl, alkenyl, phenyl, methyl, ethyl, allyl, halogen, chloro, or bromo. Also disclosed herein is a filler material having the silicon atom of a silacyclobutane group is directly or indirectly bound thereto. Also disclosed herein is a method of crosslinking silacyclobutane groups bound to a plurality of particles of a filler material. The silicon atom of the silacyclobutane group is directly or indirectly bound to the filler material. Also disclosed herein is a composition including a plurality of fibers of a polymer having reactive oxygen atoms and siloxane groups. Coordination bonds are formed between the oxygen atoms and the silicon atoms of the siloxane groups of separate fibers.

18 Claims, 5 Drawing Sheets

Related U.S. Application Data (60) Provisional application No. 61/078,800, filed on Jul. 8, 2008.

(51) Int. Cl.

| | | |
|---|---|---|
| *B82Y 40/00* | (2011.01) | |
| *C09C 1/44* | (2006.01) | |
| *D06M 13/51* | (2006.01) | |
| *D06M 13/517* | (2006.01) | |
| *C08J 3/24* | (2006.01) | |
| *D01F 6/04* | (2006.01) | |
| *D01F 6/34* | (2006.01) | |
| *D01F 9/12* | (2006.01) | |
| *C01B 32/174* | (2017.01) | |
| *C01B 32/194* | (2017.01) | |

(52) U.S. Cl.
CPC .............. *C01B 32/194* (2017.08); *C08J 3/242* (2013.01); *C09C 1/44* (2013.01); *D01F 6/04* (2013.01); *D01F 6/34* (2013.01); *D01F 9/12* (2013.01); *D06M 13/51* (2013.01); *D06M 13/517* (2013.01); *C01P 2004/13* (2013.01); *C01P 2004/16* (2013.01); *C08J 2323/06* (2013.01); *C08J 2329/04* (2013.01); *D06M 2200/50* (2013.01)

Fig. 7

FIBER REINFORCEMENT WITH 1-SILACYCLOBUTANE CROSSLINK UNITS

This application is a divisional application of U.S. Pat. No. 9,169,400 issued on Oct. 27, 2015, which claims the benefit of U.S. Provisional Application No. 61/078,800, filed on Jul. 8, 2008. The provisional application and all other publications and patent documents referred to throughout this nonprovisional application are incorporated herein by reference.

TECHNICAL FIELD

The present disclosure is generally related to fiber reinforcement.

DESCRIPTION OF RELATED ART

Epoxy composite materials have been used for decades, but suffer from long cure times and lack of bonding to the filler phase. This can lead to phase separation and breakdown of mechanical properties.

Silicone (silicon-oxygen backbone) is another class of materials used more in modern applications such as electronics. These are formed from hydrolysis of chlorosilane compounds. This chemistry leads to slow processing that requires several hours or more to partly cure and several days for full hardening. Silicon monomers such as vinyltrimethoxysilane, acrylates, or reactive Si—H polymer terminal units are generally used with fillers. During this cure process, water and/or alcohols are produced from hydrolysis which is undesirable and can lead to delamination at the polymer/filler interface.

Other polymer coating materials have been demonstrated with clay, glass, CNT or carbon nanofiber (CNF) composites, but typically only mixed together with no specific chemical bonding.

BRIEF SUMMARY

Disclosed herein is a filler material having at least one silacyclobutane group bound thereto. The silicon atom of the silacyclobutane group is directly or indirectly bound to the filler material.

Also disclosed herein is a method comprising: providing a plurality of particles of a filler material having silacyclobutane groups bound thereto, wherein the silicon atom of the silacyclobutane group is directly or indirectly bound to the filler material; and crosslinking the silacyclobutane groups.

Also disclosed herein is a composition comprising a plurality of fibers comprising a polymer having reactive oxygen atoms and siloxane groups. Coordination bonds are formed between the oxygen atoms and the silicon atoms of the siloxane groups of separate fibers.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The compositions described herein may achieve uniform covalent bonding with the oxygen atoms in nanoparticle or nanotube fillers. They may cure without generation of water and/or alcohol that can reduce mechanical strength at interfaces. This is possible using a class of polymers based on carbosilane repeat units.

Figure 1:
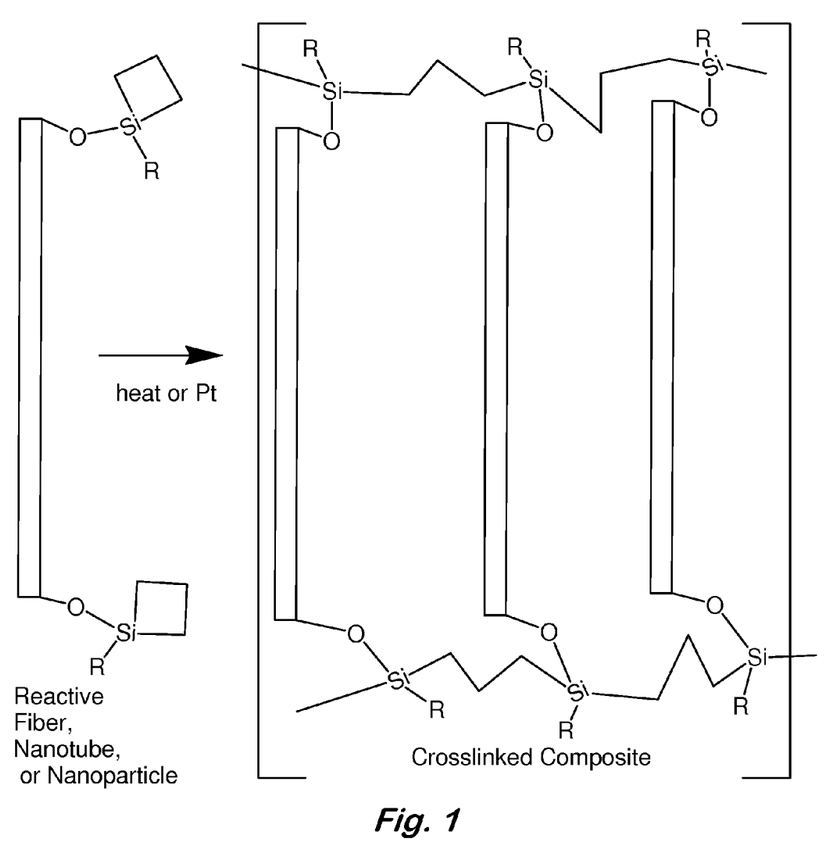
FIG. 1 shows binding of 1-alkyl-1-silacyclobutane to the ends of fibers and crosslinking with covalent polymer bonds.
Figure 2:
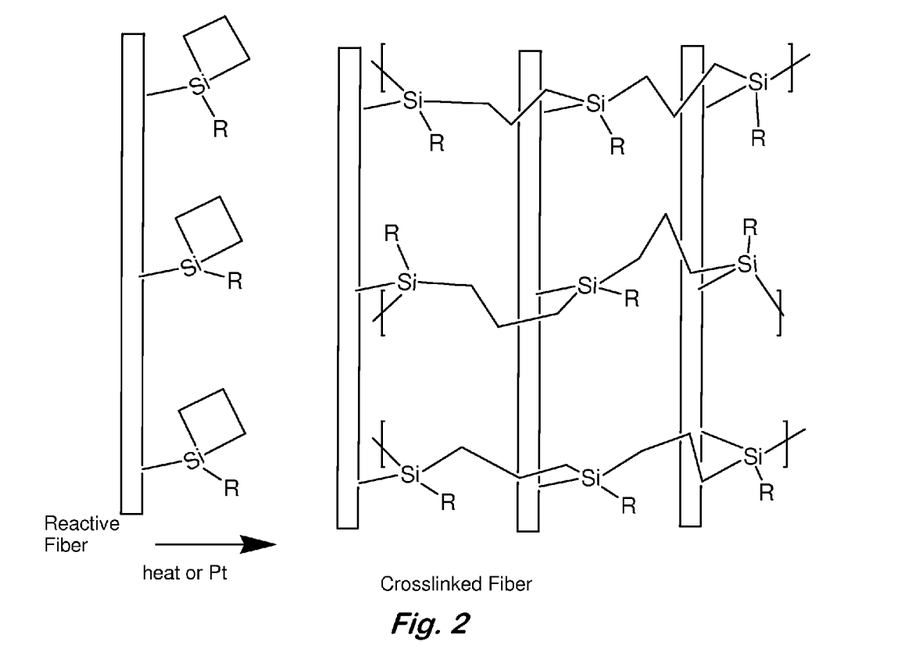
FIG. 2 shows multiple crosslinked fibers from silacyclobutane-derived polymers.

The disclosed methods may improve the mechanical properties/strength and environmental stability/longevity of polymer fibers or other fillers. In particular a new coating material for fibers used in ballistic protection applications is described. The processing technique may allow for a relatively simple manufacturing protocol. A simple bath treatment may be used to infuse void space and coat the surface of high performance fibers with a monomer material followed by modest heat/cure stage to polymerize the coating. The bath solution includes a solution of, for example, a chlorosilacylobutane monomer that is allowed to coat the surface and fill any accessible voidspace. This also allows covalent bonding to any available hydroxyl groups from defects or native to the polymer structures. The silacylobutane is crosslinked after removal from the bath by curing at approximately 100-120° C. The reactive fiber shown in FIG. 1 could be comprised of, for example, polyvinylalcohol, polyaramids such as M5, Kevlar or Nomex, or oxidized polyethylene or polystyrene. These can also represent the inorganic filler such as carbon nanotubes, nanofibers, or shaped nanoparticles. The final crosslink density attainable would be different for each polymer, with polyvinylalcohol and M5 polymer offering up to one or two silacyclobutane groups, respectively, for each repeat unit, but other polymers having far fewer reactive sites (oxygen defects) along the chains or at the ends of the fibers. FIG. 1 shows an example end-capping reaction and subsequent polymerization to an extended ladder-type polymer structure with the fiber/nanoparticle ends linked together. Such a three dimensional bonding arrangement maximizes the mechanical performance of the materials involved. This arrangement is expected to allow orientation of high aspect ratio particles as the polymers are stretched into fibers. In FIG. 2 the silacyclobutane groups are bonded directly to the polymer without the oxygenated linker such as an alcohol group.

Suitable fillers for use in the composites include, but are not limited to, a fiber material, polyvinylalcohol fiber, polyaramid fiber, poly(pyridobisimidazole-2,6-diyl-(2,5-dihydroxy-p-phenylene)) fiber (M5), poly(p-phenylene-2,6-benzobisoxazole) fiber (PBO), polyp-phenylene terephthalamide) fiber (Kevlar), poly(2,5-dihydroxy-p-phenylene terephthalamide) fiber, poly(m-phenylene terephthalamide) fiber (Nomex), oxidized polyethylene fiber, oxidized polystyrene fiber, carbon nanotubes, carbon nanofibers, nanotubes, nanoparticles, graphene particles, and graphene oxide particles. Formulas for some of these polymers are shown below.

M5

The composition may be made by reacting the filler material with a silacyclobutane compound, shown below. Generally, the R' group reacts with the filler so that the silicon atom is either bound directly to the original polymer, or the silicon atom is bound to an oxygen atom, which is bound to the filler material. The reaction can be any chemical reaction that covalently bonds the silacyclobutane compound to the filler. In one example reaction, one reactant has a halogen group and the other a hydroxyl group. The reaction produces an oxygen bridge connecting the silacyclobutane compound and the filler. A specific example of a derivatized M5 polymer is shown below.

The monomer unit may be polymerized thermally (without catalysts) or in the presence of metal catalysts such as platinum to provide high molecular weight materials. The R and R' functional groups attached to silicon in silacyclobutane compound below include chlorine, bromine, methyl, ethyl, allyl, phenyl, or other alkyl or alkenyl groups. Such polycarbosilanes shown below may be useful mechanical properties on their own without composite blending. The functional groups can be further functionalized where the R and R' groups represent terminated polymer chains such as PE or aramids such as Kevlar, Nomex, PBO, or M5. When R and R' represent simple organic groups, the molecular weights of the polymers can be several million or higher, based on GPC measurements.

Figure 3:
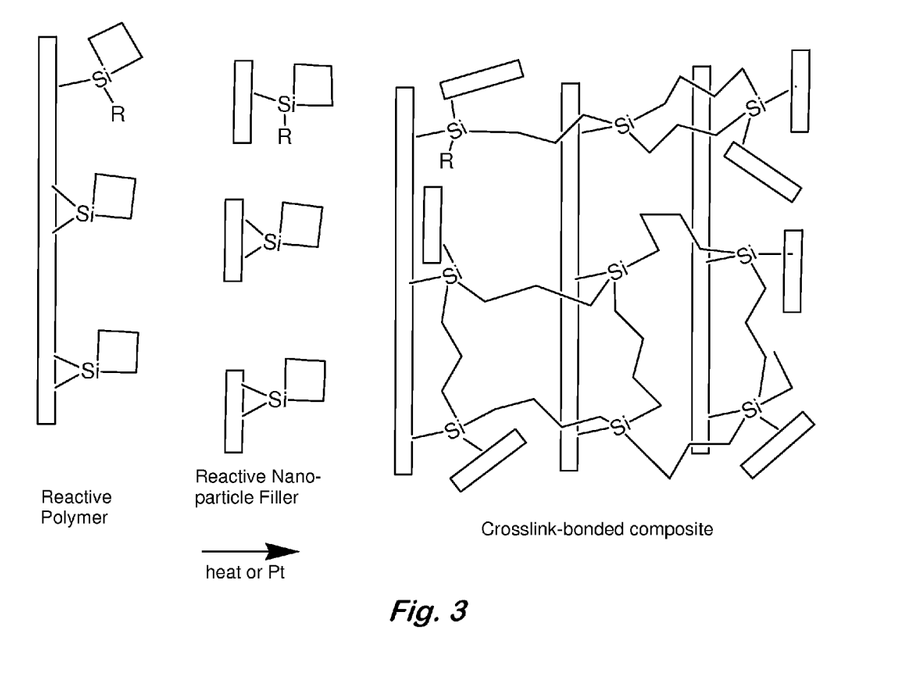
FIG. 3 shows copolymerization of filler and nanoparticles with silacyclobutane links for covalent bonding.

The copolymerization of nanoparticles with the filler or fibers is another route to improve fiber performance. The monomeric silacyclobutane groups can be loaded on both phases of the composite (filler and nanoparticles) to derive completely bonded phases between filler particles. FIG. 3 shows this arrangement with reactive filler or fiber and reactive nanoparticles. The particle size of the nanoparticles is not to scale, and is drawn small for illustrative purposes. In most composite systems, typical particle sizes are in the micron size range, which much larger than normal polymer chain length or monomer units. Functionalization of nanoparticles with carbosilane functional groups can produce hybrid (organic-inorganic) composite materials with covalent bonding to nanoparticle fillers for enhanced mechanical coupling to the matrix Trialkylsilane protecting groups are commonly used in organic chemistry to cover a reactive hydroxyl group during a different chemical treatment step. This protecting group (typically trimethylsilyl, TMS) is then removed to uncover the original hydroxyl groups. The silane functional groups described here may also have this deprotection capability and may aid in the processing of the polymer and/or composite fibers in the intermediate stages of fiber drawing.

The use of polycarbosilane-crosslinked composites may extend the composite lifetime when used under extreme conditions. The carbosilane backbone has demonstrated enhanced thermal stability including under rapid thermal cycling. The modification of existing fibers may enhance the mechanical properties with no volatile side products and little shrinkage during curing. The hydrophobic nature of the coating can also decrease water sensitivity and environmental aging problems.

Figure 4:
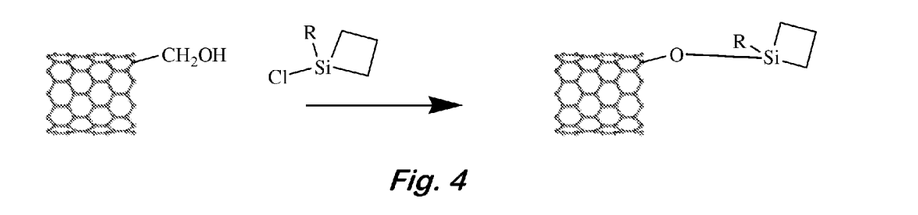
FIG. 4 shows the reaction of an oxidized carbon nanotube end with 1-chloro-1-methyl-1-silacyclobutane.

The incorporation of other functionalized nanoparticles, carbon nanotubes, and carbon nanofibers can also be achieved with this reaction system. FIG. 4 shows the reaction of a carbon nanotube with a silacyclobutane compound. The carbon nanotube has been oxidized to form a hydroxyl group. Similarly other fillers or polymers may be treated to form silacyclobutane-reactive groups on the material.

Previous ballistic fibers used hydrogen bonding (M5 and Kevlar) or van der Waals bonding (Dyneema or Spectra polyethylene). The covalent linking of polymer and fillers at the nanoscale in these new materials provides the potential for dramatic improvements in the mechanical properties of composites.

Figure 5:
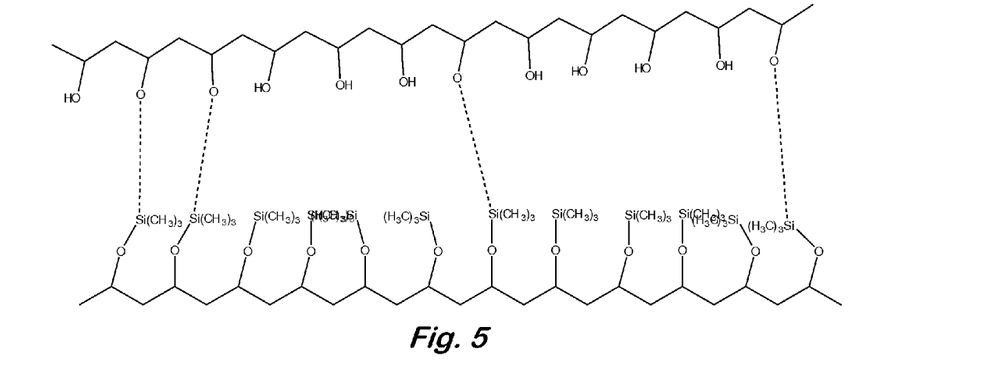
FIG. 5 shows PVA polymer chains interacting with neighboring silicon atoms.

Additionally, the use of silicon in oxygen-containing monomers and polymers takes advantage of the oxophilicity of silicon atoms and their ability to become hypercoordinate. This potentially advantageous interaction has been overlooked in previous polymer systems that feature hydrogen bonding or even weaker van der Waals interactions. FIG. 5 shows these oxophilic silicon interactions between chains of polyvinylalcohol using trimethylsiloxane groups, but any number of polymers with a native hydroxyl group or oxidized site may be used. A base reactant can be used to scavenge the HCl byproduct.

Figure 6:
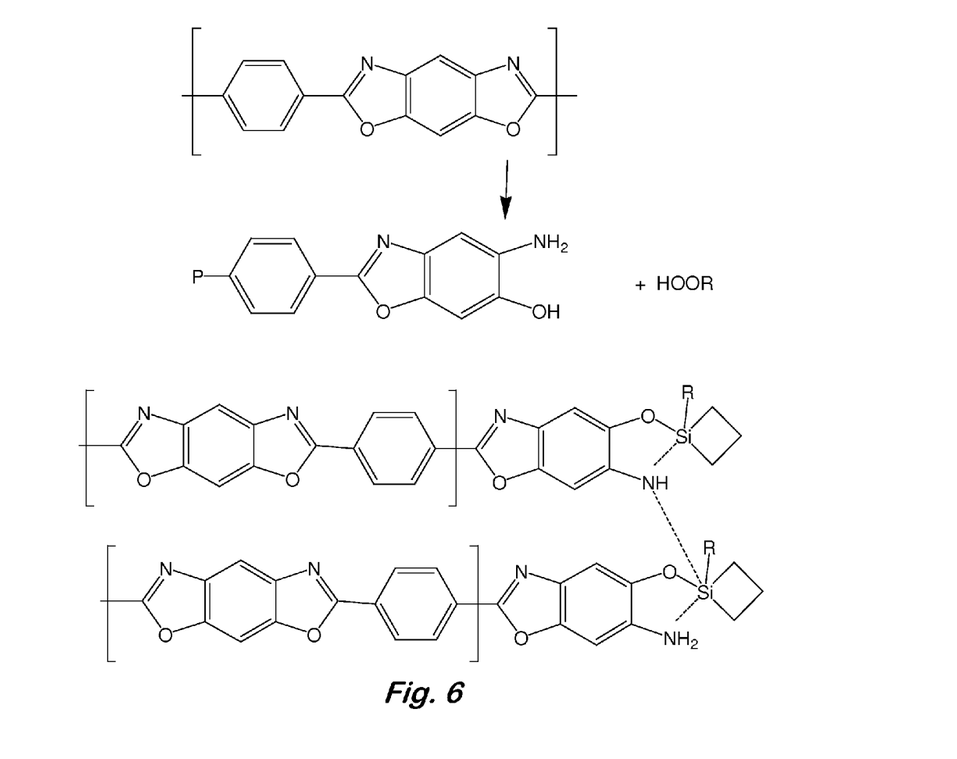
FIG. 6 shows PBO polymer chain and degradation products (top), and proposed end cap (bottom) interacting with neighboring nitrogen atom

In addition, the use of other aramid polymers such as PBO that may be sensitive to environmental degradation through hydrolysis may be treated to repel water and improve longevity. The structure shown in FIG. 6 is one example of this treatment that may cap the ends of the polymer chains, making the stable silicon-oxygen bond that is resistant to hydrolysis. Subsequent heat treatment will also induce ring-opening polymerization to crosslink the polymer fibers, selectively forming new bonds at the fiber defect (polymer chain end) sites. The additional interactions available through silicon's d-orbitals can provide three dimensional interactions with oxygen and nitrogens in neighboring chains. This is desirable to allow an improved sharing of mechanical load to the structure.

Figure 7:
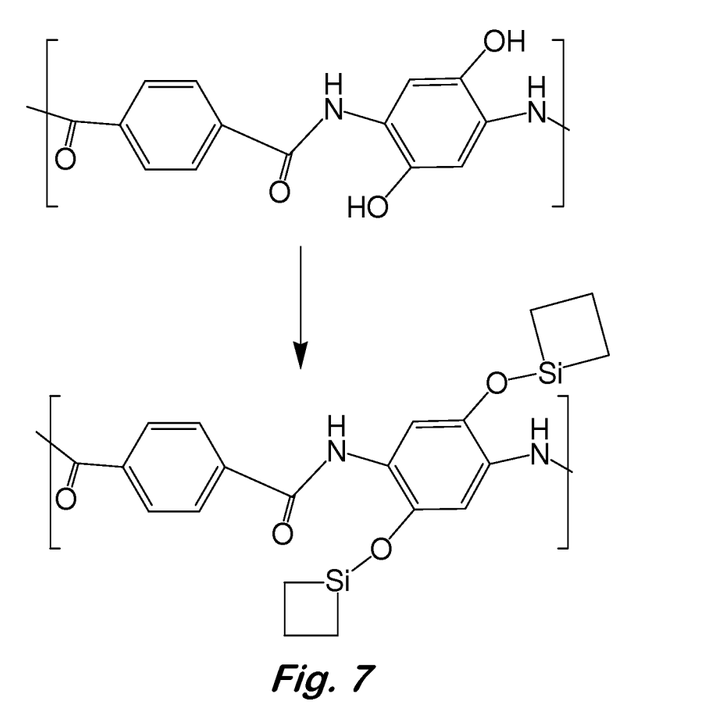
FIG. 7 shows a PBO alternative structure with silacyclobutane at each repeat unit (shown before cross linking).

It is interesting to note that the improved ballistic/strength performance for the polymer M5 over that of Kevlar is attributed to a three dimensional network of hydrogen bonding with the polymer fibers. FIG. 7 shows the polymer with attached silacyclobutane rings in the Kevlar structure, allowing the three dimensional interactions analogous to the M5 polymer interactions.

The disclosed method can improve fibers and composites performance by covalent bonding of a crosslinking agent while reducing water sensitivity as compared to aramid polymers. Improved mechanical properties/strength and environmental stability/longevity of polymer fibers may be achieved as a result of the cross linked polymer coating. This provides a coating material for polymer fibers used in mechanical strength applications and particularly in ballistic protection applications and provides a simple processing technique to allow a relatively simple manufacturing protocol which includes a simple bath treatment to infuse void space and coat surfaces of high performance fibers with a monomer material followed by modest heat/cure stage to polymerize the coating in situ.

The following examples are given to illustrate specific applications. These specific examples are not intended to limit the scope of the disclosure in this application.

Example 1

Polyethylene—A polyethylene fiber sample (10 m) was washed by passing through a large volume of THF solvent (~400 mL) in a 600 mL beaker. A short segment of glass tubing was used to draw the PE fiber to the bottom of the beaker and allow full immersion. A similar second beaker in series was used to expose the fiber to 1-methyl-1-chloro-1-silacyclobutane (2 mL in 200 mL hexane). Care was taken to minimize time after adding the chlorosilane to the hexane solution. Treated fibers were dried in air for 24 h.

Example 2

Carbon nanofiber—Isotactic polypropylene, solvents, and organosilanes were purchased from Aldrich and used as received. A carbon nanofiber sample (Applied Sciences, Inc., Cedarville, Ohio, USA) of 2.0 g was washed with acetone 100 mL, toluene, and hexane and dried briefly in air. The solid was transferred to a round-bottomed flask equipped with a magnetic stir bar and dry nitrogen purge. A 100 mL portion of fresh hexane was added and the mixture was stirred at ~1000 rpm. The 1-methyl-1-chloro-1-silacyclobutane was added dropwise over 20 minutes. The reaction was stirred for 24 h at room temperature, then filtered in air and washed with hexane, THF, water, and methanol. The treated carbon nanofiber was dried in an oven at 80° C. for 4 h.

Melt extrusion was done with a CSI LE-075 mixing extruder (Custom Scientific Instruments) at 60-80% rotor speed and takeup settings of 4-10. Rotor temperature was set to 191 and barrel temperature to 182° C. Orifice size was 0.125 inch. The polymer pellets and carbon sources were added as powders with no premixing or solvents. All samples were mixed with only one pass.

When used as filler in composite fibers, the treated carbon sample may provide much better dispersion in polypropylene when melt extruded at 190° C. About 2% by mass carbon nanotubes (CNT) or carbon nanofiber (CNF) can be incorporated in this manner with minimal void formation and agglomeration of particles.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A filler material having at least one silacyclobutane group bound thereto, wherein the silicon atom of the silacyclobutane group is directly or indirectly bound to the filler material;
   wherein the filler material is a fiber material, carbon nanotubes, carbon nanofibers, inorganic nanoparticles, graphene particles, graphene oxide particles, or a combination thereof.

2. The filler material of claim 1, wherein the silicon atom is bound to an oxygen atom, which is bound to the filler material.

3. The filler material of claim 1, wherein the filler material is a fiber material.

4. The filler material of claim 1, wherein the filler material is polyvinylalcohol fiber, polyaramid fiber, poly(pyridobisimidazole-2,6-diyl-(2,5-dihydroxy-p-phenylene)) fiber, poly(p-phenylene-2,6-benzobisoxazole) fiber, poly(p-phenylene terephthalamide) fiber, poly(2,5-dihydroxy-p-phenylene terephthalamide) fiber, poly(m-phenylene terephthalamide) fiber, oxidized polyethylene fiber, oxidized polystyrene fiber, or a combination thereof.

5. A method comprising:
   providing the filler material of claim 1; and
   crosslinking the silacyclobutane groups.

6. The method of claim 5, wherein the silicon atom is bound to an oxygen atom, which is bound to the filler material.

7. The method of claim 5, wherein the filler material is a fiber material.

8. The method of claim 5, wherein the filler material is polyvinylalcohol fiber, polyaramid fiber, poly(pyridobisimidazole-2,6-diyl-(2,5-dihydroxy-p-phenylene)) fiber, poly(p-phenylene-2,6-benzobisoxazole) fiber, poly(p-phenylene terephthalamide) fiber, poly(2,5-dihydroxy-p-phenylene terephthalamide) fiber, poly(m-phenylene terephthalamide) fiber, oxidized polyethylene fiber, oxidized polystyrene fiber, or a combination thereof.

9. The method of claim 5, further comprising:
   reacting the filler material with a silacyclobutane compound.

10. The method of claim 9, further comprising:
    treating the filler material to form silacyclobutane-reactive groups on the filler material.

11. A composition comprising:
    a plurality of the filler material of claim 3;
    wherein the fibers comprise a polymer having reactive oxygen atoms; and
    wherein coordination bonds are formed between the oxygen atoms and the silicon atoms of the siloxane groups of separate fibers.

12. The composition of claim 11;
wherein the polymer is polyvinyl alcohol; and
wherein the siloxane groups are trimethylsiloxane.

13. The composition of claim 11, wherein the polymer is polyaramid fiber, poly(pyridobisimidazole-2,6-diyl-(2,5-dihydroxy-p-phenylene)) fiber, poly(p-phenylene-2,6-benzobisoxazole) fiber, poly(p-phenylene terephthalamide) fiber, poly(2,5-dihydroxy-p-phenylene terephthalamide) fiber, poly(m-phenylene terephthalamide) fiber, oxidized polyethylene fiber, or oxidized polystyrene fiber.

14. The composition of claim 11, wherein the siloxane groups comprise one or more alkyl, alkenyl, phenyl, methyl, ethyl, allyl, fluoro, chloro, or bromo groups.

15. The filler material of claim 1, wherein the filler material is carbon nanotubes, carbon nanofibers, graphene particles, graphene oxide particles, or a combination thereof.

16. The filler material of claim 1, wherein the filler material is inorganic nanoparticles.

17. The method of claim 5, wherein the filler material is carbon nanotubes, carbon nanofibers, graphene particles, graphene oxide particles, or a combination thereof.

18. The method of claim 5, wherein the filler material is inorganic nanoparticles.

\* \* \* \* \*